(12) United States Patent
Mabuchi et al.

(10) Patent No.: US 7,364,002 B2
(45) Date of Patent: Apr. 29, 2008

(54) VEHICLE UNDERBODY STRUCTURE

(75) Inventors: Tomoki Mabuchi, Toyota (JP); Koji Mineda, Toyota (JP); Takashi Ishikawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 446 days.

(21) Appl. No.: 11/047,777

(22) Filed: Feb. 2, 2005

(65) Prior Publication Data

US 2005/0167968 A1 Aug. 4, 2005

(30) Foreign Application Priority Data

Feb. 2, 2004 (JP) ............... 2004-025940

(51) Int. Cl.
*B60K 13/04* (2006.01)
(52) U.S. Cl. ............. 180/296; 180/291; 180/89.2; 180/311; 220/562
(58) Field of Classification Search ........... 180/296, 180/291, 311, 89.2; 220/562, 563, 564
See application file for complete search history.

(56) References Cited

U.S. PATENT DOCUMENTS

| | | | |
|---|---|---|---|
| 3,426,937 A * | 2/1969 | Valentinotti et al. | 220/560.01 |
| 3,459,444 A * | 8/1969 | Rofe | 285/226 |
| 3,905,505 A * | 9/1975 | Gallay | 220/563 |
| 4,192,142 A * | 3/1980 | Haegele | 60/322 |
| 4,757,872 A | 7/1988 | Inomata | |
| 4,821,840 A * | 4/1989 | Harwood et al. | 181/282 |
| 4,909,530 A * | 3/1990 | Tsukada et al. | 180/296 |
| 5,114,184 A * | 5/1992 | Shimomura et al. | 280/784 |
| 5,195,607 A * | 3/1993 | Shimada et al. | 180/296 |
| 5,195,780 A * | 3/1993 | Inoue et al. | 280/834 |
| 5,381,871 A * | 1/1995 | Ohta | 180/296 |
| 5,409,264 A * | 4/1995 | Nakatani | 280/834 |
| 5,445,241 A * | 8/1995 | Nakamura et al. | 180/296 |
| 5,560,651 A * | 10/1996 | Kami et al. | 280/788 |
| 6,875,258 B2 * | 4/2005 | Kuperus | 96/147 |

FOREIGN PATENT DOCUMENTS

| | | |
|---|---|---|
| GB | 685025 | 5/1951 |
| GB | 1019589 | 1/1965 |
| JP | 4-116622 | 10/1992 |
| JP | 8-118971 | 5/1996 |

OTHER PUBLICATIONS

Automobile Structure, Jul. 2004, vol. 1, pp. 11-12; vol. 2 pp. 167-176.
Chinese Office Action dated Jul. 28, 2006.

* cited by examiner

*Primary Examiner*—Christopher P. Ellis
*Assistant Examiner*—John D Walters
(74) *Attorney, Agent, or Firm*—Finnegan, Henderson, Farabow, Garrett & Dunner, LLP

(57) ABSTRACT

At the underside of a vehicle body, a fuel tank and an exhaust muffler are disposed alongside of each other along a vehicle body longitudinal direction, with a drive shaft being disposed between the fuel tank and the exhaust muffler. The front and rear of the fuel tank are attached with tank bands to two cross members. The exhaust muffler is attached to the two cross members via rubber supports. Because the exhaust muffler and the fuel tank are attached to common cross members, the noise vibration characteristics of the vehicle body are improved while suppressing an increase in the weight of the vehicle body.

7 Claims, 6 Drawing Sheets

VEHICLE UNDERBODY STRUCTURE

CROSS-REFERENCE TO RELATED APPLICATION

This application claims priority under 35 USC 119 from Japanese Patent Application No. 2004-25940, the disclosure of which is incorporated by reference herein.

BACKGROUND OF THE INVENTION

1. Field of the Invention

The present invention relates to a vehicle underbody structure, and in particular to a vehicle underbody structure of an automobile.

2. Description of the Related Art

Conventionally, with respect to a vehicle underbody structure of an automobile, a configuration has been known where a fuel tank is disposed at one side of a rear propeller shaft and at the side where the front propeller shaft is positioned, and where an exhaust muffler (also called a "silencer") is disposed at the other side of the rear propeller shaft.

However, when the fuel tank and the exhaust muffler are attached to frame members of the vehicle body, the points at which vibrations are inputted to the vehicle body increase when the fuel tank and the exhaust muffler are fixed to different frame members. As a result, the noise vibration characteristics of the vehicle body become worse unless measures to counter the noise vibration are taken with respect to the frame members. For this reason, by taking measures to counter the noise vibration with respect to the frame members, the vehicle body weight increases when the noise vibration characteristics of the vehicle body are improved.

SUMMARY OF THE INVENTION

In consideration of these facts, the present invention provides a vehicle underbody structure that can improve the noise vibration characteristics of the vehicle body while suppressing an increase in the weight of the vehicle body.

A first aspect of the invention provides a vehicle underbody structure including: a fuel tank disposed at an underside of a vehicle body; an exhaust muffler disposed alongside of the fuel tank at a vehicle width-direction side of the fuel tank at the underside of the vehicle body; and a cross member that supports both the fuel tank and the exhaust muffler.

Thus, the same cross member supports both the fuel tank disposed at the vehicle underbody and the exhaust muffler disposed alongside of the fuel tank at a vehicle width-direction side of the fuel tank at the vehicle underbody. As a result, because the exhaust muffler is fixed to the cross member, whose rigidity is high and which can support the fuel tank, the support rigidity of the exhaust muffler can be raised without using a separate reinforcement member, and the noise vibration characteristics of the vehicle body resulting from the exhaust system can be improved. For this reason, the noise vibration characteristics of the vehicle body can be improved while suppressing an increase in the weight of the vehicle body.

The vehicle underbody structure of this aspect may be configured to further include two front pipes of different lengths coupled to an engine side of the exhaust muffler, with the rigidities of the two front pipes of different lengths being different.

When the vehicle underbody structure is configured in this manner, the rigidities of the two front pipes of different lengths are different, whereby the heat deformation amounts of the front pipes can be made equal, due to the difference in the rigidities of the front pipes, when the temperature of the front pipes has risen a predetermined value. For this reason, a difference in displacement at the portions where the two front pipes are coupled to the exhaust muffler can be suppressed when the temperature has risen a predetermined value.

Also, the vehicle underbody structure of this aspect may be configured so that a projection portion that extends inside a tunnel portion is formed on part of the fuel tank, and a full-tank slanted fluid level of the fuel tank is set inside the projection portion.

When the vehicle underbody structure is configured in this manner, the full-tank slanted fluid level of the fuel tank becomes higher. As a result, the capacity of the fuel tank can be increased without affecting the space of the vehicle interior.

Because the vehicle underbody structure of the first aspect includes the fuel tank disposed at the vehicle underbody, the exhaust muffler disposed alongside of the fuel tank at a vehicle width-direction side of the fuel tank at the vehicle underbody, and the same cross member that supports both the fuel tank and the exhaust muffler, there is the excellent effect that the noise vibration characteristics of the vehicle body can be improved while suppressing an increase in the weight of the vehicle body.

Moreover, by configuring the vehicle underbody structure to include the two front pipes of different lengths coupled to the engine side of the exhaust muffler, with the rigidities of the two front pipes of different lengths being different, there is, in addition to the above effect, the excellent effect that the difference in displacement at the portions where the two front pipes are coupled to the exhaust muffler can be suppressed when the temperature has risen a predetermined value.

Moreover, by configuring the vehicle underbody structure so that the projection portion extending inside the tunnel portion is formed on part of the fuel tank and the full-tank slanted fluid level of the fuel tank is set inside the projection portion, there is the excellent effect that the capacity of the fuel tank can be increased without affecting the space of the vehicle interior.

A second aspect of the invention provides a vehicle underbody structure including: a fuel tank disposed at an underside of a vehicle body; an exhaust muffler disposed alongside of the fuel tank at a vehicle width-direction side of the fuel tank at the underside of the vehicle body; and plural cross members that support both the fuel tank and the exhaust muffler.

DETAILED DESCRIPTION OF THE INVENTION

Figure 1:
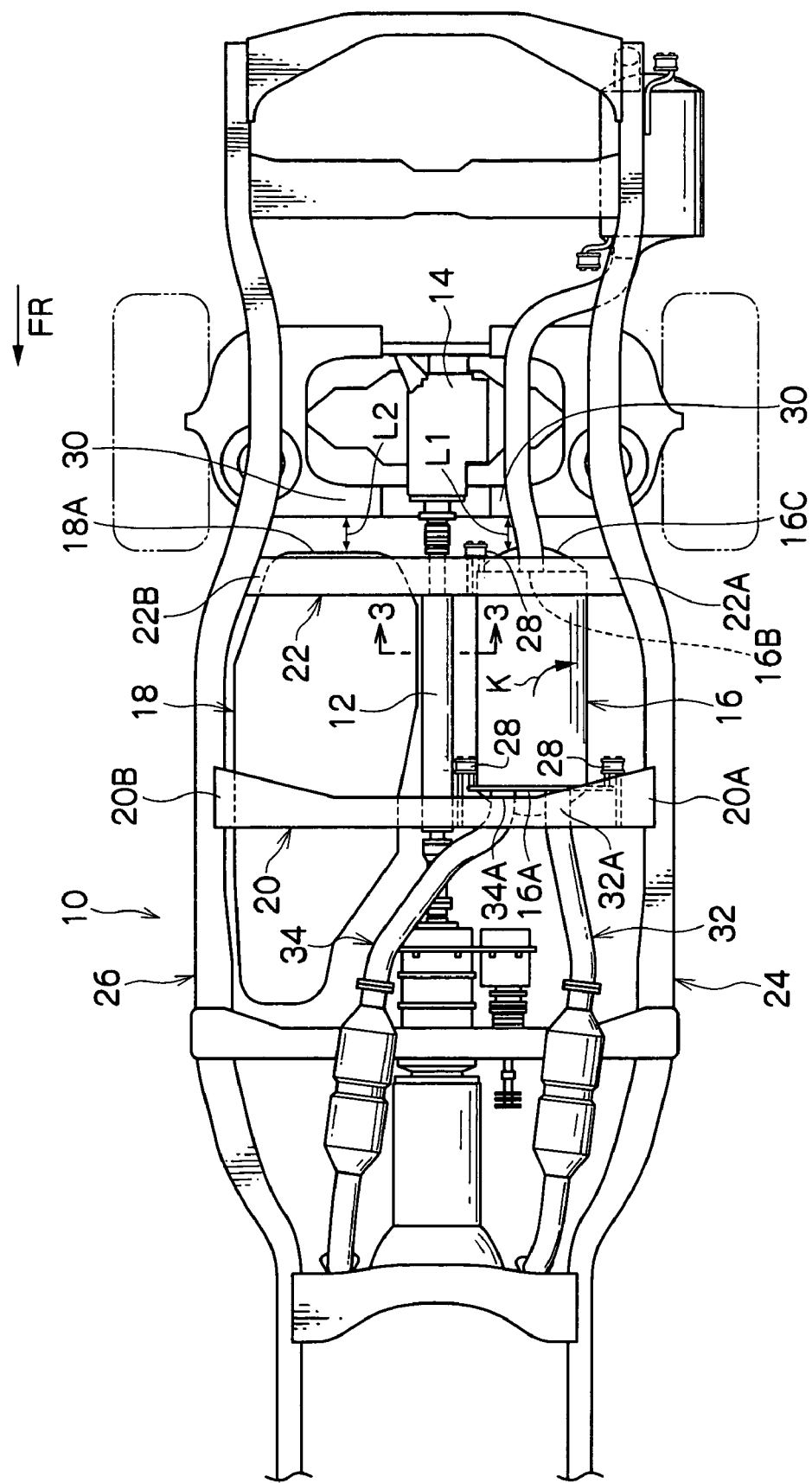
FIG. 1 is a plan view showing a vehicle underbody structure, seen from above the vehicle body, pertaining to an embodiment of the invention.

An embodiment of a vehicle underbody structure of the invention will be described in accordance with FIGS. 1 to 4.

In the drawings, arrow FR represents a vehicle body front direction, arrow UP represents a vehicle body up direction, and arrow IN represents a vehicle width-direction inner side, i.e., a direction toward a vehicle inner side along a vehicle width direction.

As shown in FIG. 1, a vehicle body 10 of an automobile in the present embodiment is a vehicle body disposed with a frame, such as an SUV (Sports Utility Vehicle) or a pickup truck. A drive shaft 12 is disposed along a vehicle body longitudinal direction in a vehicle width-direction center portion of the vehicle underbody. A differential 14 is coupled to a rear end portion of the drive shaft 12.

An exhaust muffler 16 configuring part of an exhaust pipe is disposed in the vehicle body longitudinal direction parallel to the drive shaft 12 at the left side of the drive shaft 12 at a longitudinal-direction intermediate portion of the vehicle body 10. A fuel tank 18 is disposed parallel to the drive shaft 12 at the right side of the drive shaft 12.

Thus, the exhaust muffler 16 is disposed at the opposite side of the fuel tank 18 in the vehicle width direction, with the drive shaft 12 sandwiched between the exhaust muffler 16 and the fuel tank 18, at the underside of the vehicle body 10.

The fuel tank 18 is attached with unillustrated tank bands to undersides of two front and rear cross members 20 and 22. Vehicle width-direction end portions 20A, 20B, 22A and 22B of the cross members 20 and 22 are joined to left and right side frames 24 and 26.

As shown in FIG. 1, a front end portion 16A of the exhaust muffler 16 is attached to the front-side cross member 20 via a pair of left and right rubber supports 28. The left side of a rear end portion 16B of the exhaust muffler 16 is attached to the rear-side cross member 22 via a support rubber 28.

Namely, the fuel tank 18 is attached to the two front and rear cross members 20 and 22, and the exhaust muffler 16 is attached to the same cross members 20 and 22.

A rear end position 16C of the exhaust muffler 16 and a rear end position 18A of the fuel tank 18 match or substantially match. Left and right rear suspensions 30 are disposed rearward of the exhaust muffler 16 and the fuel tank 18. Thus, a distance L1 between the rear end position 16C of the exhaust muffler 16 and the rear suspension 18, and a distance L2 between the rear end position 18A of the fuel tank 18 and the rear suspension 30, are the same or substantially the same.

Figure 2:
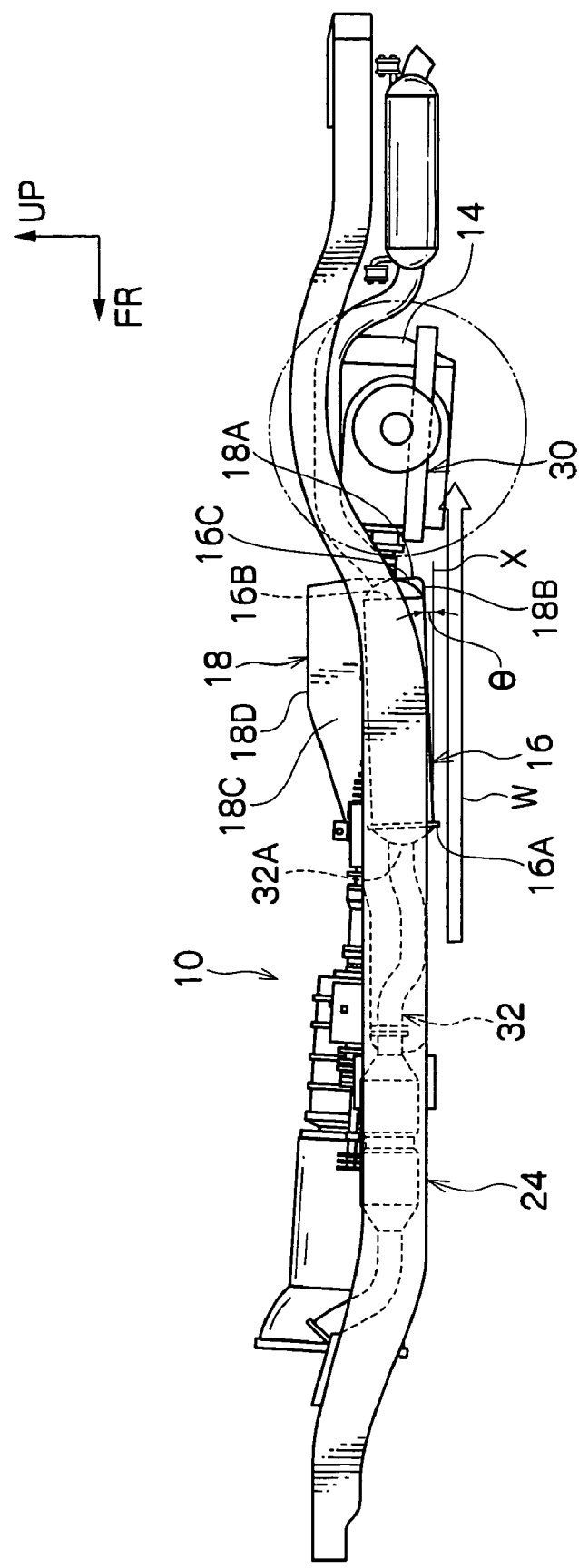
FIG. 2 is a side view showing the vehicle underbody structure pertaining to the embodiment of the invention.

Thus, as shown in FIG. 2, the wind passing below the exhaust muffler 16 (arrow W) and the wind passing below the fuel tank 18 (arrow W) become uniform and flow below the rear suspensions 30 towards the rear of the vehicle body.

Rear end portions 32A and 34A of two front pipes 32 and 34 of different lengths are coupled to both vehicle width-direction side portions of the front end portion 16A of the exhaust muffler 16. Unillustrated front end portions of the front pipes 32 and 34 are coupled to an engine of a type where the front pipes 32 and 34 are coupled to the left and right sides of the engine, such as a V engine.

In the present embodiment, the front pipe 34 disposed at the right side of the vehicle body is longer than the front pipe 32 disposed at the left side of the vehicle body.

Also, the rigidity of the front pipe 34 disposed at the right side of the vehicle body is higher than the rigidity of the front pipe 32 disposed at the left side of the vehicle body. The heat capacity of the longer right-side front pipe 34 is greater than the heat capacity of the shorter left-side front pipe 32, so that, for example, when the temperature has risen a predetermined value due to the startup of the engine, the overall heat deformation amount of the long front pipe 34 and the overall heat deformation amount of the short front pipe 32 become equal.

As shown in FIG. 2, the muffler 16 is slanted so that the rear side rises at a predetermined angle θ (e.g., 2°) with respect to a horizontal plane X. Also, an undersurface of the 18B is slanted so that the rear side rises at a predetermined angle θ (e.g., 2°) with respect to the horizontal plane X.

Thus, the vehicle underbody structure is configured so that the wind W can smoothly flow towards the rear of the vehicle body and the ability of the exhaust muffler 16 to drain water can also be improved.

Figure 3:
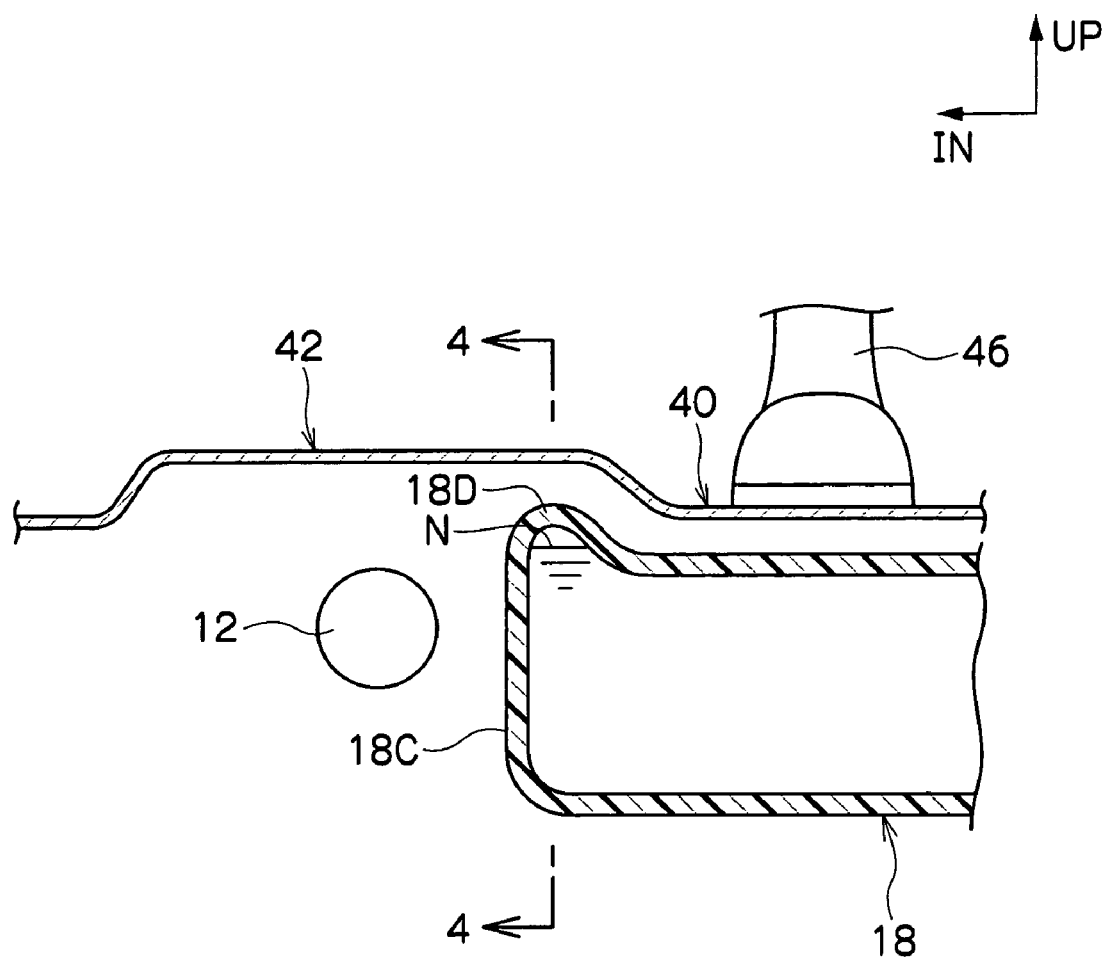
FIG. 3 is an enlarged cross-sectional view along line 3-3 of FIG. 1.

As shown in FIG. 3, a vehicle width-direction inner side end portion 18C of the fuel tank 18 extends inside a tunnel portion 42 below a floor panel 40, and a projection portion 18D that projects upward is formed in the vehicle width-direction inner side end portion 18C.

Figure 4:
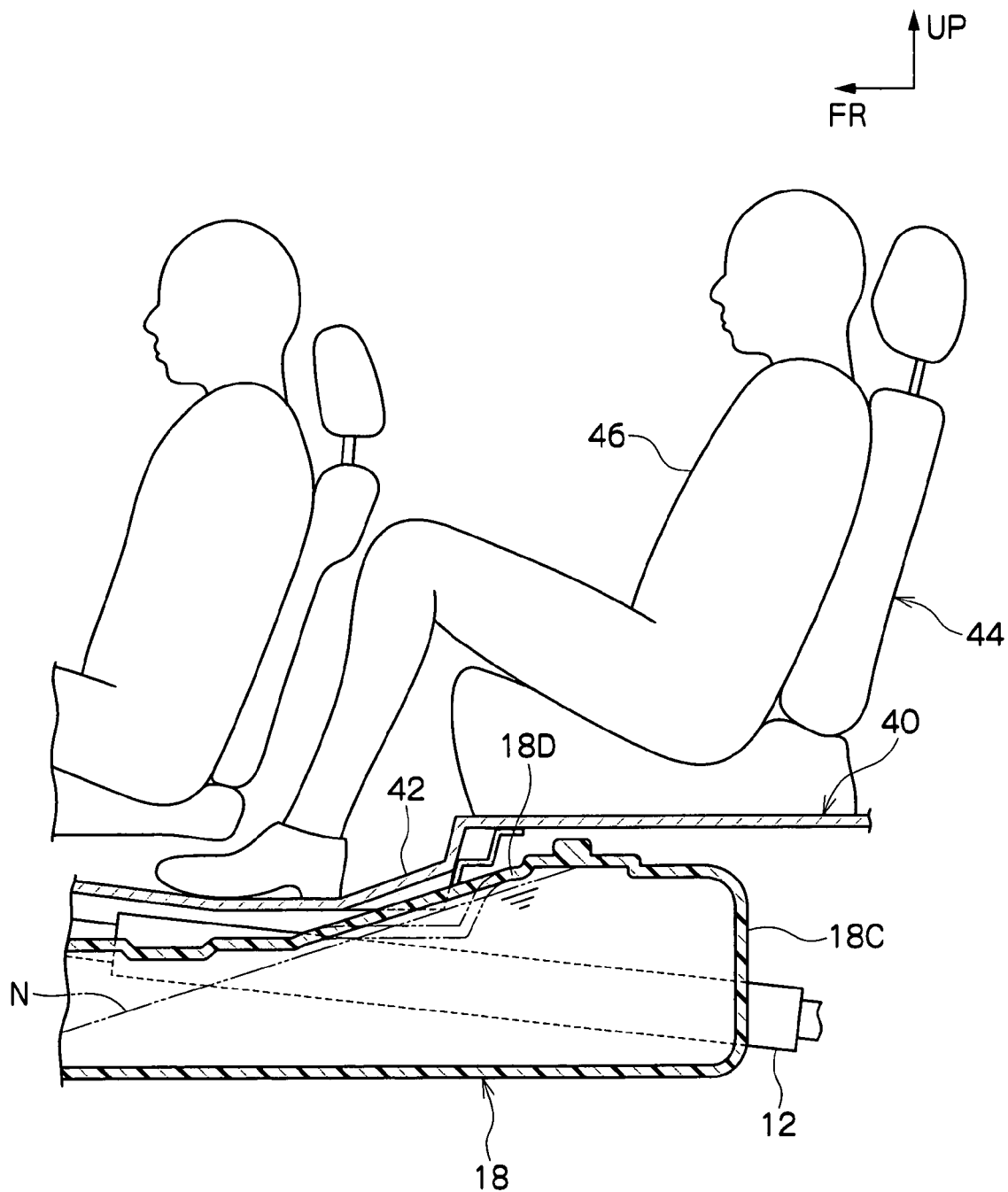
FIG. 4 is a cross-sectional view along line 4-4 of FIG. 3.

As shown in FIG. 4, a full-tank slanted fluid level N of the fuel tank 18 is set in the projection portion 18D of the fuel tank 18. When the vehicle body 10 is slanted at a predetermined angle, the fuel tank 18 can be filled with fuel to a position where the fluid level inside the fuel tank 18 does not exceed the full-tank slanted fluid level N.

Reference numeral 44 represents a second seat (back seat), and reference numeral 46 represents a passenger.

Next, the action of the present embodiment will be described.

In the present embodiment, both the fuel tank 18 disposed at the vehicle underbody and the exhaust muffler 16 disposed alongside of the fuel tank 18 at the vehicle width-direction side of the fuel tank 18 at the vehicle underbody are supported by same cross members 20 and 22 configuring the frame members of the vehicle body 10.

As a result, by fixing the exhaust muffler 16 to the cross members 20 and 22, whose rigidity is high and which can support the fuel tank 18, the support rigidity of the exhaust muffler 16 can be raised without using a separate reinforcement member, and the noise vibration characteristics of the vehicle body 10 resulting from the exhaust system can be improved. For this reason, the noise vibration characteristics of the vehicle body 10 can be improved while suppressing an increase in the weight of the vehicle body 10.

Also, in the present embodiment, the distance L1 between the rear end position 16C of the exhaust muffler 16 and the rear suspension 18, and the distance L2 between the rear end position 18A of the fuel tank 18 and the rear suspension 30, are the same or substantially the same. As a result, as shown in FIG. 2, the wind passing below the exhaust muffler 16 (arrow W) and the wind passing below the fuel tank 18 (arrow W) become uniform and flow below the rear suspensions 30 towards the rear of the vehicle body. For this reason, the aerodynamic characteristics of the vehicle body 10 can be improved without providing a separate under cover or the like.

Moreover, in the present embodiment, because the exhaust muffler 16 is slanted so that the rear side rises at a predetermined angle θ (e.g., 2°) with respect to the horizontal plane X, the wind W can smoothly flow towards the rear of the vehicle body and the ability of the exhaust muffler 16 to drain water can also be improved.

Also, in the present embodiment, the heat capacity of the longer right-side front pipe 34 is greater than the heat capacity of the shorter left-side front pipe 32. As a result, when the temperature has risen a predetermined value due to the startup of the engine, the overall heat deformation amount of the long front pipe 34 and the overall heat deformation amount of the short front pipe 32 become equal. For this reason, a difference in the displacement resulting from thermal expansion at the portions where the two front pipes 32 and 34 are coupled to the exhaust muffler 16 can be suppressed, and twisting of the pair of left and right rubber supports 28 and rotation of the exhaust muffler 16 in the vehicle width direction (direction of arrow K in FIG. 1) generated by a difference in the deformation amounts of the two front pipes 32 and 34 can be suppressed.

Also, in the present embodiment, as shown in FIG. 4, the vehicle width-direction inner side end portion 18C of the fuel tank 18 extends inside the tunnel portion 42 of the floor panel 40, and the full-tank slanted fluid level N is set inside the projection portion 18D that projects upward. Thus, the full-tank slanted fluid level N of the fuel tank 18 becomes higher. As a result, the capacity of the fuel tank 18 can be significantly increased without affecting the space inside the vehicle interior.

Figure 5:
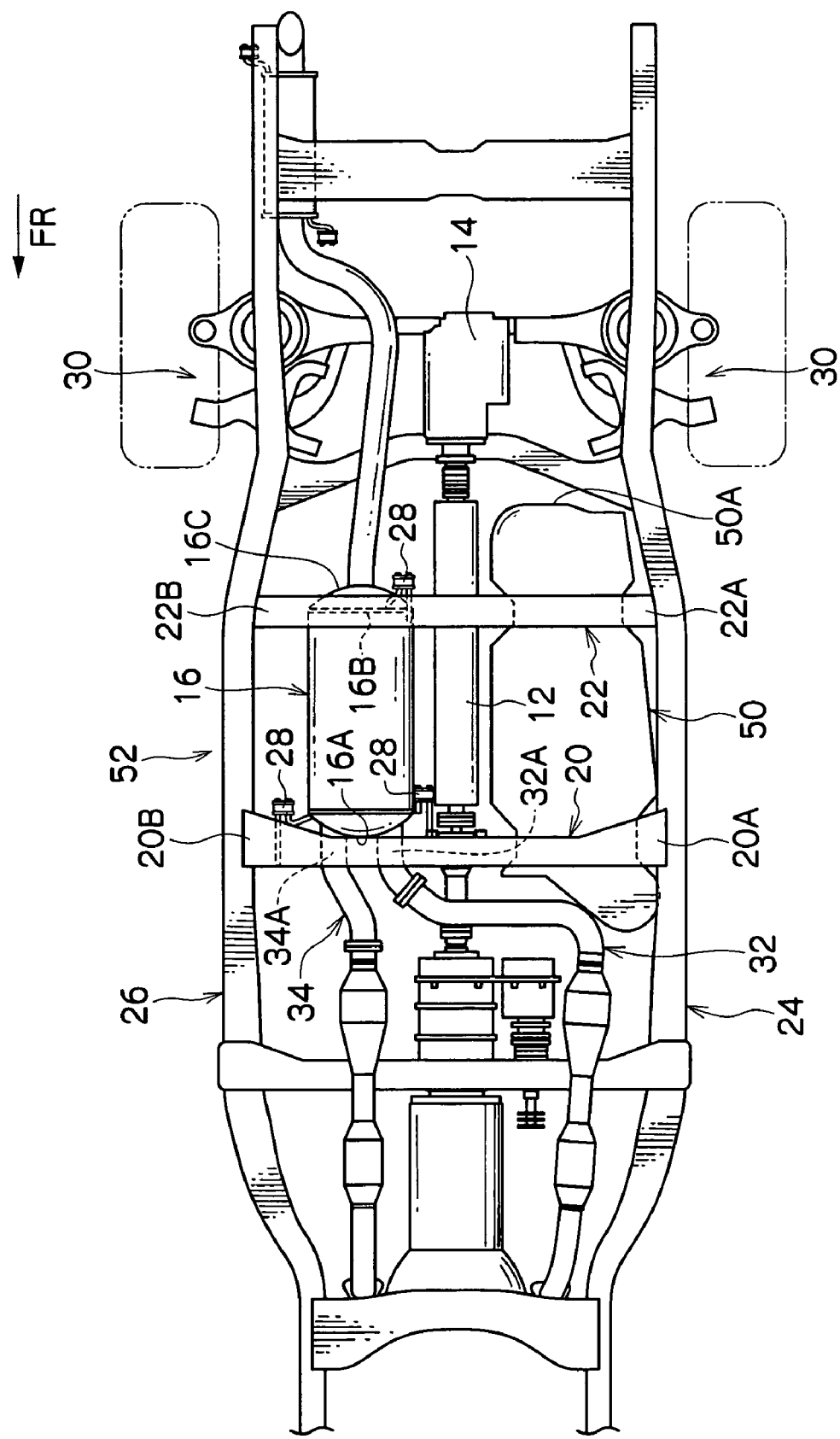
FIG. 5 is a plan view showing a vehicle underbody structure, seen from above the vehicle body, pertaining to another embodiment of the invention.

The invention has been described in detail above in regard to a specific embodiment, but the invention is not limited to this embodiment. It will be apparent to those skilled in the art that other embodiments are possible within the scope of the invention. For example, the structure of the vehicle body is not limited to the preceding embodiment. As shown in FIG. 5, the structure of the vehicle body may be configured as in a vehicle body 52 where the exhaust muffler 16 is disposed at the right side of the drive shaft 12 and a fuel tank 50 is disposed at the left side of the drive shaft 12. In this vehicle body 52, the left-side front pipe 32 is long and the right-side front pipe 34 is short, and the rear end position 16C of the exhaust muffler 16 and a rear end position 50A of the fuel tank 50 do not match.

Figure 6:
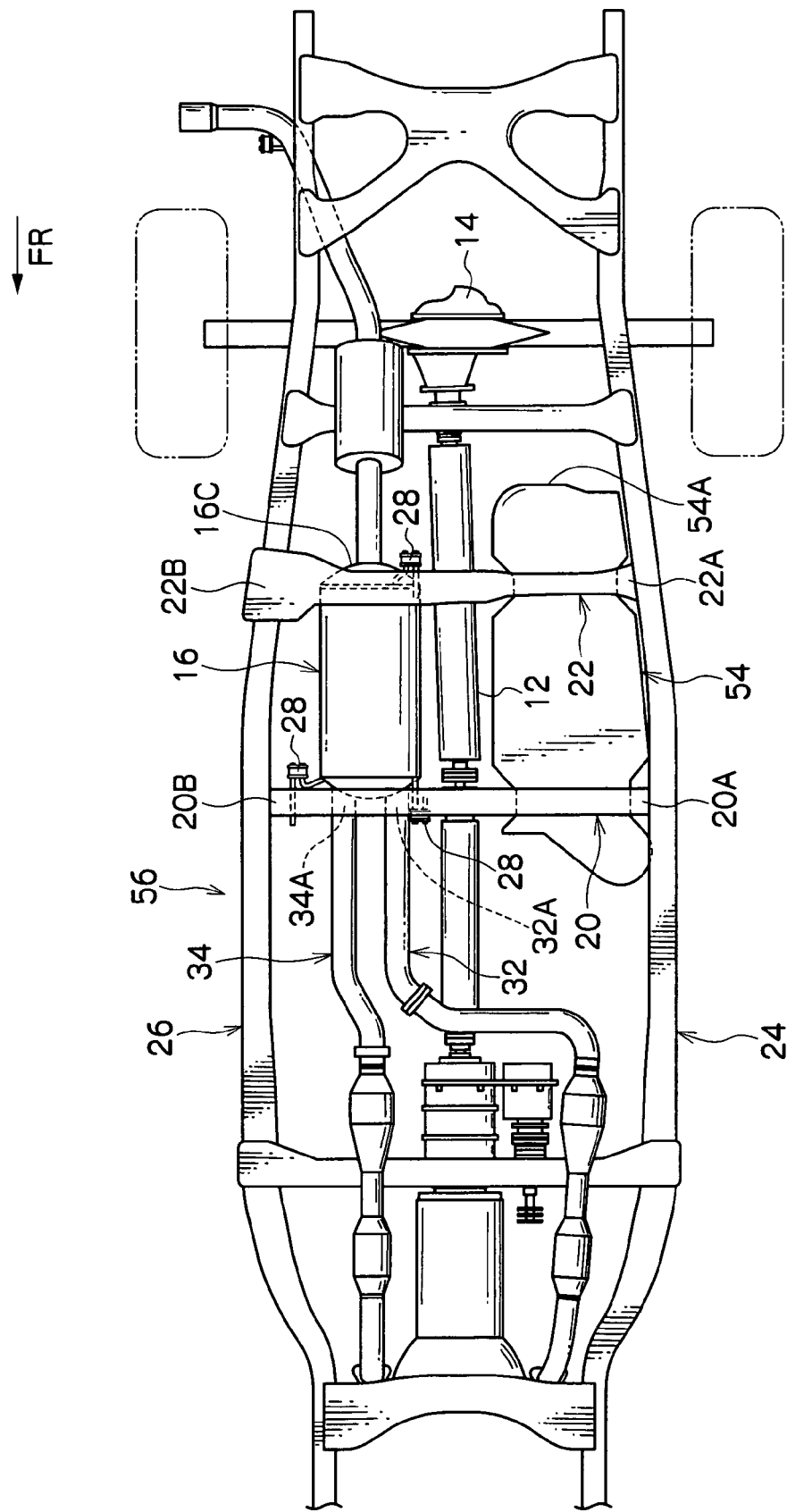
FIG. 6 is a plan view showing a vehicle underbody structure, seen from above the vehicle body, pertaining to another embodiment of the invention.

Also, in a vehicle body 56 shown in FIG. 6, the front pipes 32 and 34 are longer than those shown in FIG. 5, but the disposition of the fuel tank and the exhaust muffler with respect to the drive shaft 12 are similar to that of the vehicle body 52 of FIG. 5. In the vehicle body 56 shown in FIG. 6, the exhaust muffler 16 is disposed at the right side of the drive shaft 12 and a fuel tank 54 is disposed at the left side of the drive shaft 12. In this vehicle body 56, the left-side front pipe 32 is long and the right-side front pipe 34 is short, and the rear end position 16C of the exhaust muffler 16 and a rear end position 54A of the fuel tank 54 do not match.

Further, a single cross member that supports both the fuel tank 18 and the exhaust muffler 16 can be used instead of cross members 20 and 22 in FIG. 1.

What is claimed is:

1. A vehicle underbody structure comprising:
   a fuel tank disposed at an underside of a vehicle body;
   an exhaust muffler disposed alongside of the fuel tank at a vehicle width-direction side of the fuel tank at the underside of the vehicle body;
   plural cross members that support both the fuel tank and the exhaust muffler;
   a first front pipe having a front end and a rear end, a first length and a first rigidity; and
   a second front end pipe having a front end and a rear end, and a second length and a second rigidity;
   wherein the front end portions of the respective first and second front pipes are coupled to an engine, and the rear end portions of the respective first and second front pipes are coupled to front end portions of the exhaust muffler;
   and wherein the first length is longer than the second length, and the first rigidity is higher than the second rigidity.

2. The vehicle underbody structure of claim 1, wherein both ends of the cross member are supported at a side frame extending in a longitudinal direction in the vicinities of side portions of the vehicle body.

3. The vehicle underbody structure of claim 1, further comprising a drive shaft that extends in a longitudinal direction of the vehicle body at the underside of the vehicle body, wherein the fuel tank and the exhaust muffler are disposed so that the drive shaft is disposed between the fuel tank and the exhaust muffler.

4. The vehicle underbody structure of claim 1, wherein a rear end portion of the fuel tank and a rear end portion of the exhaust muffler are disposed at the same position in a longitudinal direction of the vehicle body.

5. The vehicle underbody structure of claim 1, wherein an undersurface of the fuel tank is slanted upward at a predetermined angle at a rear side thereof, and an undersurface of the exhaust muffler is slanted upward at a predetermined angle at a rear side thereof.

6. The vehicle underbody structure of claim 1, wherein deformation amounts of the first and second front pipes resulting from heat become substantially equal at the time of the startup of the engine.

7. The vehicle underbody structure of claim 1, wherein a projecting projection portion is formed on part of an upper surface of the fuel tank, and a full-tank slanted fluid level of the fuel tank is set inside the projection portion.

* * * * *